United States Patent [19]
Kreis et al.

[11] Patent Number: 5,417,471
[45] Date of Patent: May 23, 1995

[54] BODYWORK OF A PASSENGER CAR WITH AN ELECTRONICS HOUSING

[75] Inventors: Gundolf Kreis, Oberstimm; Ingo Ledendecker, Buxheim; Hans J. Kaldenbach, Neckarsulm, all of Germany

[73] Assignee: Audi AG, Ingolstadt, Germany

[21] Appl. No.: 75,473

[22] PCT Filed: Dec. 16, 1991

[86] PCT No.: PCT/EP91/02420

§ 371 Date: Jun. 15, 1993

§ 102(e) Date: Jun. 15, 1993

[87] PCT Pub. No.: WO92/11167

PCT Pub. Date: Jul. 9, 1992

[30] Foreign Application Priority Data

Dec. 20, 1990 [DE] Germany .................. 40 41 016.1

[51] Int. Cl.[6] .................................................. B62D 25/08
[52] U.S. Cl. ................................. 296/194; 296/37.1; 296/198
[58] Field of Search ...................... 296/37.1, 192, 194, 296/198, 203, 205, 208

[56] References Cited

U.S. PATENT DOCUMENTS 3,188,132  6/1965  Schwiering et al. ............... 296/194

FOREIGN PATENT DOCUMENTS

| 0266767 | 5/1988 | European Pat. Off. |
| 0146716 | 12/1988 | European Pat. Off. |
| 3619183 | 12/1987 | Germany |
| 3732087 | 12/1988 | Germany |
| 3824857 | 2/1989 | Germany |
| 3820644 | 12/1989 | Germany |
| 2-293276 | 12/1990 | Japan ......................... 296/194 |
| 6334 | 11/1986 | WIPO |

OTHER PUBLICATIONS

"Aluminium Um Kunststoff Im Verbund—Ein Schritt Zur Leichteren Autokarosserie", Journal Aluminium, vol. 64, 1988, No. 9.

Patent Abstracts of Japan, vol. 13, No. 237 (M-833), Jun. 5, 1989, (of No. 1-47640, Feb. 22, 1989).

Primary Examiner—David M. Mitchell
Assistant Examiner—Andrew C. Pike
Attorney, Agent, or Firm—Jacques M. Dulin

[57] ABSTRACT

The invention relates to the bodywork of a passenger car having an electronics housing formed integral therewith. The bodywork includes an A post, a front suspension strut mount disposed in front of and more towards the longitudinal center of the vehicle than the A post, and a front fender brace. According to the invention, a front suspension strut bearer connects the front suspension strut mount to a middle portion of the A post at about the height of the apron wall. A generally triangular pocket-like space is formed by the curved outward suspension strut bearer, the front fender brace, and the underlying wheel arch. According to the invention, the walls of this pocket-like space form a housing well suitable for use as an electronics housing. The housing walls are firmly secured to the adjacent parts of the bodywork. Accordingly, the electronics housing forms part of the bearing structure of the bodywork and is closed on top by a cover and thus the housing and cover contribute to the overall rigidity of the vehicle bodywork, especially in the critical area of the front suspension strut mount. Thus, unlike the prior art, a separate electronics housing is no longer necessary.

19 Claims, 2 Drawing Sheets

Fig_1

BODYWORK OF A PASSENGER CAR WITH AN ELECTRONICS HOUSING

FIELD

The present invention relates to improvements in motor vehicle bodywork fabrication, and more particularly the invention relates to a vehicle bodywork construction having an electronics housing formed integral therewith.

BACKGROUND

In the field of motor vehicle bodywork fabrication, it is the conventional practice to provide a separate electronics housing for enclosing the vehicle's electronics components, particularly the central control electronics as well as the fuse assembly. In the usual case, the electronics housing is installed after final assembly of the bodywork. German Patent document DE-PS 36 19 183 teaches to position the electronics housing within a "water chamber" of the vehicle bodywork in order to protect against dirt and other contaminants from impairing the operation of integrated electrical components. The "water chamber" is defined as the region, bounded by partition walls, disposed between the passenger compartment and the engine compartment.

Thus, in this design the installation space for the electronics components is formed as a substantially closed, dual enclosure whereby the water chamber, which is comprised of sheet metal parts, forms an outer housing for receiving and securing the electronics housing proper which is typically formed of plastic. The outer housing or water chamber is formed in combination with the vehicle bodywork and is used to accommodate and support the inner plastic electronics housing. Thus, the inner plastic electronics housing by itself does not perform any supportive function for the vehicle bodywork.

Other designs are known from the prior art wherein a plastic electronics housing is placed in some other housing space provided on the bodywork. As is evident, the arrangement of the plastic electronics housing in a specially configured outer housing provided to the bodywork requires an additional consumption of material to fabricate the outer housing. Other disadvantages with these prior art designs include the labor and expense associated with sealing and waterproofing the outer housing formed on the bodywork and the labor and expense involved with securing the electronics housing within the outer housing.

Another problem of the prior art designs involves providing adequate cooling for electronics components within the nested inner and outer housings, since some of the electronics components consume large amounts of power and accordingly give off a lot of heat. To overcome this, it is known in the art to provide a separate fan to cool the enclosed space of the electronics housing. This solution, however, is costly and requires additional components and space requirements.

In accordance with conventional practice, the load bearing frame members of the self-supporting vehicle bodywork typically comprise hollow-section bearers made from at least two deep-drawn metal sheets which are welded together.

The steel sheets used to construct the self-supporting vehicle bodywork are typically shaped in a deep drawing process. While the pressing dies for shaping the steel sheets are relatively expensive, they do permit large production runs and are therefore cost effective for mass production. However, in view of the associated high tooling costs, the described process is very cost-intensive for smaller production runs.

A more cost-favorable solution for small series production in particular is known from European Patent document EP 0 146 716 wherein it is disclosed how to manufacture vehicle bodies for passenger cars having a bearing structure comprising of hollow section bearers which are joined together by joining elements or node connectors. The hollow section bearers are formed as extruded aluminum sections and the node connectors are formed as light metal cast pieces. In addition to being a more cost-favorable solution for small series production, the aluminum bodywork described in EP 0 146 716 is very lightweight and is more resistant to corrosion than a sheet metal bodywork.

Another known vehicle bodywork having a bearing structure formed of extruded light metal hollow section members joined together by light metal cast pieces is disclosed in an article entitled "Aluminum Und Kundstoff IM Verbund-ein Schritt Zur Leichteren Autokarosserie" appearing in *Aluminum Journal* 64, No. 9 (1988). In this disclosure, the suspension strut mount, being disposed forwardly and inwardly of the A post, is supported along its bottom surface on the respective longitudinal bearer across an extruded section bearer. Furthermore, an extruded section bearer, formed as a suspension strut bearer, connects the suspension strut mount to the middle region of the A-post adjacent the upper portion of the apron or fire wall. However, the integration of an electronics housing within the bodywork is not shown or suggested.

It is also well known in the art to provide the bodywork of passenger cars with wheel arches bounded by sheet metal parts and bearer pieces in the form of stays for mounting fenders. It would be highly desirable to incorporate a housing for the electronics components within an existing known bodywork design without substantial modification or added expense and wherein the proposed electronics housing solution would not require additional cooling apparatus.

THE INVENTION

Objects

It is therefore a principle object of the present invention to modify a generic bodywork of a passenger car to include an integrally formed housing for the vehicle's electronics components so that the material and assembly expense associated with installation of the electronics housing are substantially reduced.

It is another object of the invention to provide an electronics housing which contributes to the strength and rigidity to the vehicle bodywork.

Other and further objects and advantages of the invention will become apparent from the following written description, drawings, and appended claims.

Summary

The invention concerns a simple and low cost integration of an electronics housing within a known front end bearing structure of a "space frame" type motor vehicle bodywork. According to the invention, the front end bearing structure is provided with at least one front suspension strut mount disposed forwardly and inwardly of (i.e., closer towards the vehicle longitudinal center axis) a respective forward A post. The A post consists of the vertically oriented forward door post (onto which a front door is hinge mounted) and an obliquely oriented forward roof post (which defines the side frame boundary between the front windshield and a side window pane).

According to the invention, a suspension strut bearer is disposed connected between the suspension strut mount and the approximate middle region of the A post at about the height of the apron wall. In this way, a pocket-like space having an top opening is formed between the suspension strut bearer (which extends rearwardly and outwardly from its forward and inwardly disposed connection at the front suspension mount to its rearward and outwardly disposed connection at the A post), the longitudinally oriented fender stay, and the periphery of the wheel arch. This pocket-like space has a generally triangular shape in top plan view, due to the acute angle subtended by the longitudinally oriented fender stay and the outwardly curved suspension strut bearer. The bottom and side walls of this pocket-like space are formed as a housing pocket and are connected to the adjacent parts of the bodywork, and in particular, the fender stay and the suspension strut bearer. In this way, the resulting housing pocket may be directly used as the housing for receiving the vehicles electronics components. In the preferred embodiment, a housing lid is included and is appropriately sized to cover the generally triangular top opening.

In other words, the usual sheet metal bodywork parts are removed from the region between the suspension strut bearer, the fender stay, and the wheel arch in the vehicle bodywork to create an open recess. This recess is then closed by the structural part (i.e., housing lid) of the electronics housing. Thus, the electronics housing now belongs to the raw bodywork system and is formed integral with the bodywork. This is in direct contrast to the electronics housings of the prior art, which were typically separate plastic enclosures and which were fitted within a specially configured and single function installation space located between the engine and passenger compartments and only then after final assembly of the bodywork was complete.

Thus, in the present invention, a reduction in materials is achieved since the specially configured installation space for receiving the separately contained electronics housing of the prior art is advantageously eliminated. Further, assembly time and labor for installing the electronics housing are greatly reduced since the additional steps of sealing and waterproofing the extra installation space (i.e., outer housing) are eliminated. This makes it easier to control the environmental influences on the electronics components.

It is also now easier to control the cooling of the electronics components since they are only surrounded by a single wall enclosure, in contrast to the double wall enclosures of the prior art. In one embodiment, the side and bottom walls of the electronics housing form portions of the wheel arch and/or adjacent water chamber.

With appropriate dimensioning, the electronics housing can be designed with high strength and rigidity. In this way, the electronics housing, being part of the bearing structure, helps to increase the rigidity of the body in the critical region of the front suspension strut mount. The invention permits a wide range of dimensioning for the housing walls and cover lid, so that the strength and elongation requirements with respect to the long-term strength and crash requirements can be satisfied. A further increase in rigidity can be achieved by an appropriately firm design of the cover lid and its connection to the housing.

Peripheral ridges in the form of welding or gluing flanges are placed on the outside wall surfaces of the electronics housing to permit a strong and permanent connection to adjacent pieces of the bodywork within the bearing structure of the bodywork.

As was mentioned previously, the separate, typically plastic electronics housings known from the prior art are fitted to the vehicle bodywork after final assembly and thus do not contribute to the overall rigidity of the bodywork. In the present invention, however, since the electronics housing is formed integrally with the bearing structure of the bodywork, it is proposed to form the electronics housing out of metal, and preferably as a cast aluminum piece. This makes it easy to achieve the requisite rigidity and strength for a part of the bearing structure of the bodywork. It is also easy to produce a cast metal piece in any desired complicated shape, and which is easily adapted to the geometry of the adjoining pieces. Although a metallic electronics housing is preferable, it is also possible to employ an electronics housing with plastic walls of appropriately stable configuration.

According to another feature of the invention, it is proposed to form cooling fins on the outside facing walls of the electronics housing. In this case, the electronics housing can also be used as a cooling body, especially when made of metal. In a preferred embodiment, the electronics components are mounted along the inner housing walls with large supporting surfaces. In this way, a sufficient cooling via heat transfer is accomplished without the need for further cooling measures such as, for example, the addition of a separate housing fan, etc.

According to another feature of the invention, the upper edge of the electronics housing is formed as an upstanding peripheral ridge extending above the adjoining parts of the bodywork much like a collar. In this way, the cover and its seal against the adjacent parts of the bodywork are likewise elevated above the adjoining parts of the bodywork so that any water which may accumulate around the peripheral ridge is not permitted to get into the seal. Thus, the seal can be simple and reliable in design.

Electrical cable connections are introduced into the electronics housing in the familiar manner, i.e., through rubber sleeves for sealing. It is advantageous to provide round holes in the ridge or collar at the top, into which the rubber sleeves with the cables are inserted from the top, thus eliminating a thread-through. The peripheral upraised ridge or collar is also a suitable region for the application of a material thickening in order to provide a desired reinforcement to the bodywork. The upstanding peripheral ridge or collar also preferably extends a sufficient distance above the level of the opening to permit room for attachment of spring clips to provide for detachable fastening of the cover.

In an economical solution, the housing cover can be designed as a plastic closing cap. However, the housing cover is advantageously formed as a cast aluminum piece so that the cover itself also contributes to the rigidity of the bodywork.

In an especially preferred embodiment of the invention, the electronics housing has an opening adjacent the interior space (passenger compartment) of the vehicle. Such an opening preferably exists behind the dashboard where it is not directly visible. The proposed opening serves two useful purposes. First, the opening provides a direct and convenient passage way for directing the cable connections to the functional elements in the dashboard. And second, the opening permits the exchange of air between the passenger compartment and the electronics housing. Thus, a good ventilation of the electronics housing with the dry interior air is achieved, thereby improving the cooling of the electronics components and preventing water condensation within the electronics housing. Additional and expensive cooling measures from a special circulation of air in the electronics housing are therefore unnecessary.

DRAWINGS

The invention shall be explained with additional features, details, and advantages by means of an example embodiment in which.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives, and uses of the invention, including what we presently believe is the best mode of carrying out the invention.

Figure 1:
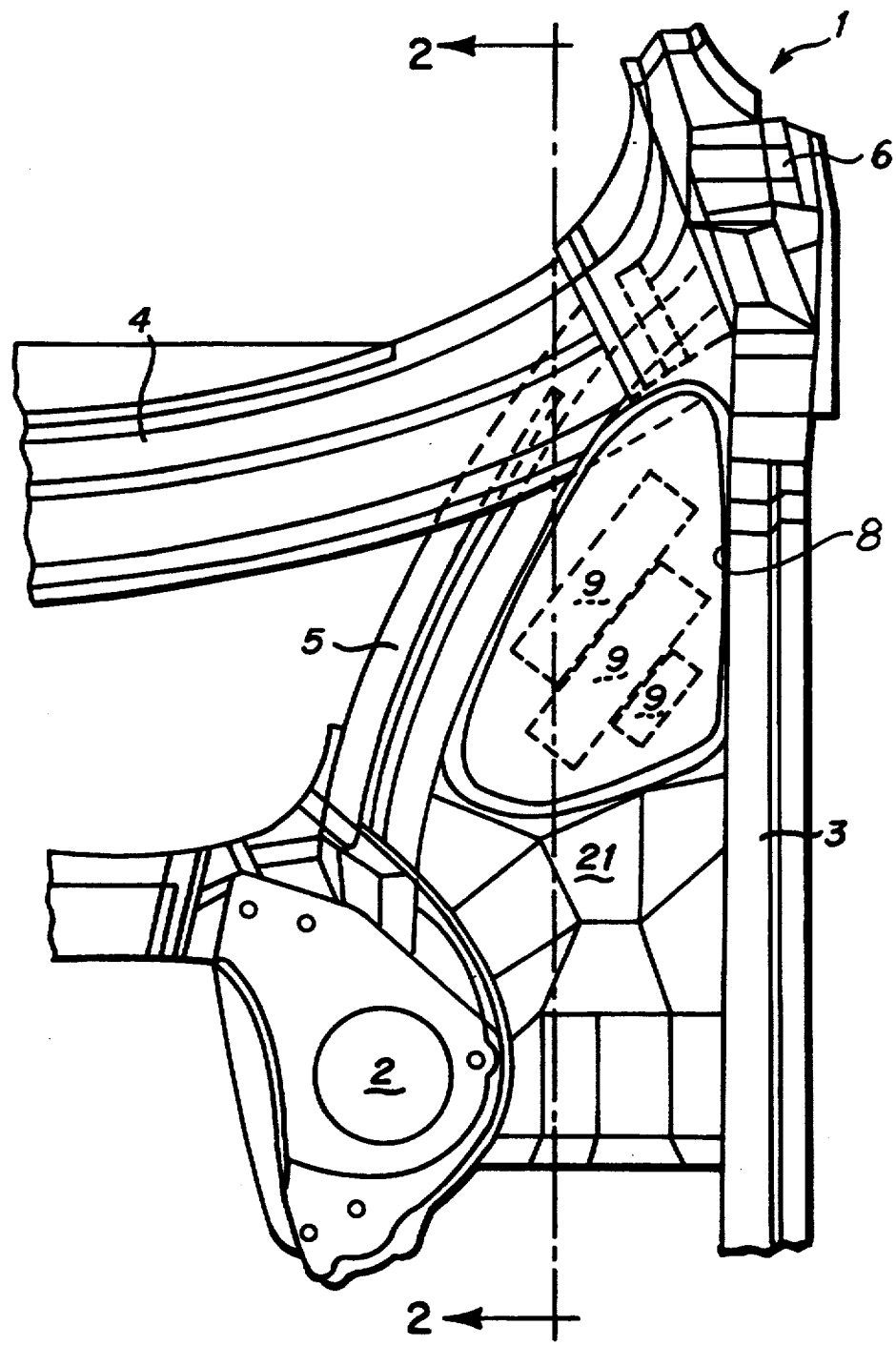
FIG. 1 is a top plan view showing a generally triangular electronics housing formed integrally within the bodywork of a passenger car in the region of a front suspension strut mount.

FIG. 1 is a top plan view of a forward corner region of a vehicle bodywork showing a front doorpost, designated generally as A post 1, a suspension strut mount 2 disposed more forwardly of and more inwardly toward the longitudinal center axis of the vehicle than the A post 1, a longitudinally oriented fender stay 3, and a transverse bearer or lower window stringer 4. A hollow section suspension strut bearer member 5 connects the suspension strut mount 2 to a joining element 6 located at the approximate middle portion of the A post 1 (i.e., at about the height of the apron wall). The fender stay 3 and the transverse bearer 4 are also connected to this joining element 6.

The arrangement of the suspension strut bearer member 5 with the fender stay 3 in combination with the periphery of the wheel arch 7 (see FIG. 2) produces a pocket-like space having an upward facing top opening in the shape of a triangle, as seen in the top plan view of FIG. 1. The bottom and side walls of this space conveniently form the housing pocket or an electronics housing 8. Electronics components 9 are installed and secured within the electronics housing 8.

Figure 2:
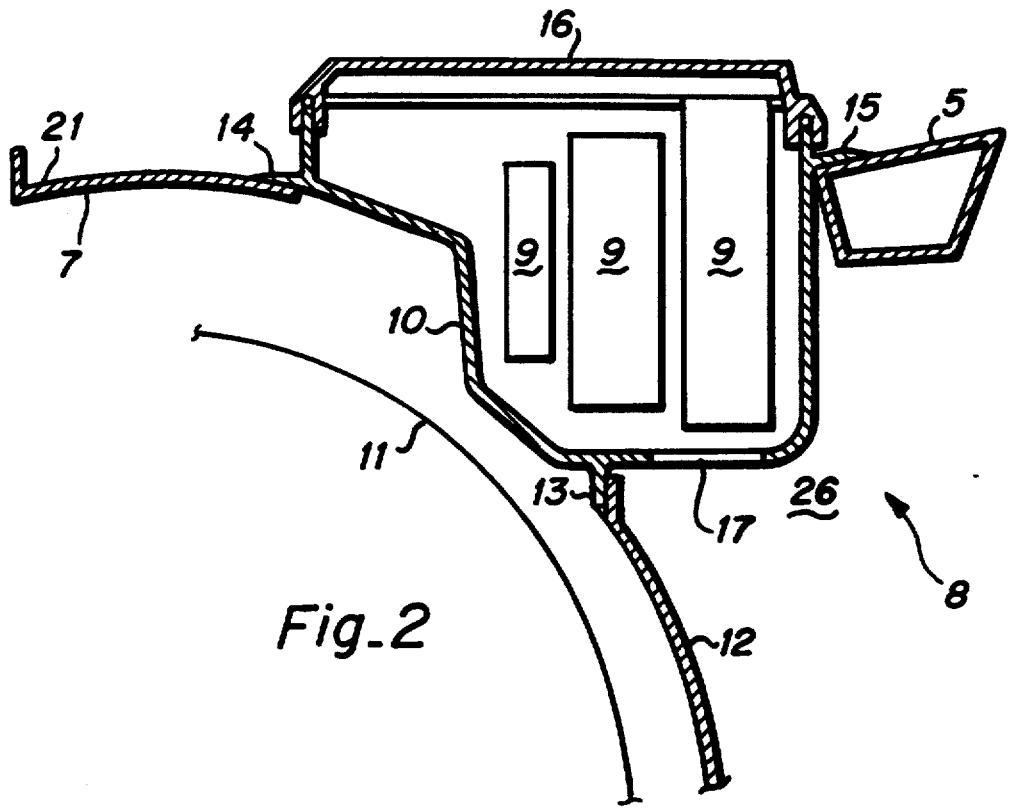
FIG. 2 is a cross-section view of the electronics housing taken along line and in the direction of arrows 2—2 of FIG. 1.

From the cross section of FIG. 2, it can be seen that a portion of the wheel arch is formed by a bottom wall 10 of the electronics housing 8 (window stringer 4 and its flange connection is omitted for clarity). A portion of the circumference of a front tire is shown in schematic representation as the circular arc 11.

The electronics housing 8 is preferably connected to adjacent metal sheets 21, 12 of the wheel arch by means of welding flanges 13, 14. Furthermore, the electronics housing 8 is also connected to the adjacent suspension strut bearer member 5 across an additional welding flange 15 and to the fender stay 3 (not shown in FIG. 2). Thus, the electronics housing represents part of the bearing structure of the bodywork and is integrated in the structure of the bodywork as a whole.

The top opening of the electronics housing 8 is tightly closed with a cover 16. Both the electronics housing 8 and the cover 16 are preferably formed as cast aluminum pieces. However, it is understood that a suitable plastic or other like material capable of formation into the desired housing and cover shapes may also be used.

The electronics housing 8 is provided with an opening 17 in its bottom wall to permit connection with the adjoining passenger space 26. Thus, in this way, the relatively dry interior air of the passenger space is exchanged with the air inside the housing. Further, electrical connection cables from the interior of the passenger space 26 or from behind the dashboard can easily be led into the electronics housing 8 through the opening 17 without the need for costly passages and seals.

Figure 3:
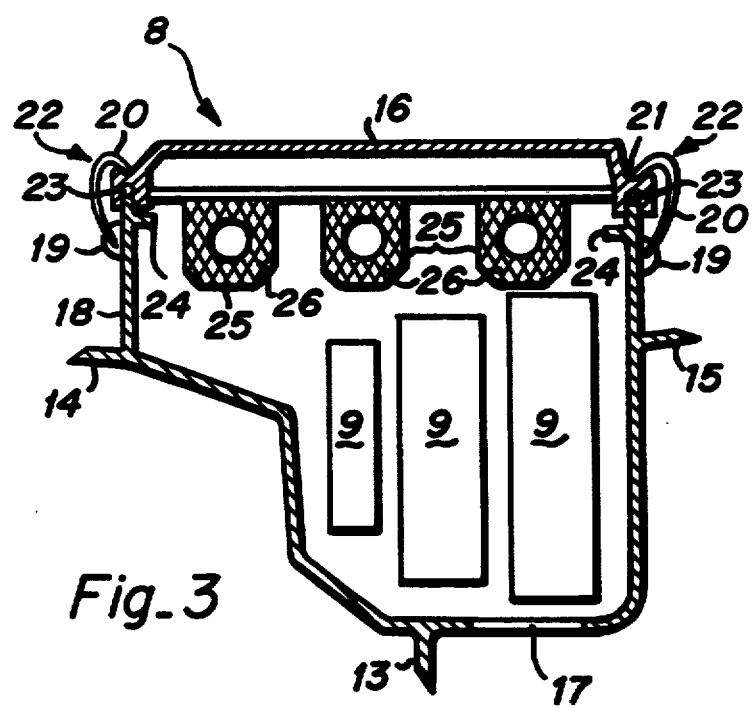
FIG. 3 is a cross-section view of an electronics housing similar to FIG. 2 with additional details.

FIG. 3 is a cross-sectional view of an electronics housing similar to that shown in FIG. 2 but with further configurations and details. Again, the welding flanges 13, 14, 15 used for the connection and the electronics components 9 and the cover 16 are readily apparent.

The connecting flanges 14, 15 define the region of the adjoining bodywork elements where water tends to accumulate. Accordingly, an upwardly extended peripheral ridge member or collar 18 is preferably extended a sufficient distance above the water level to prevent accumulated water in this region from contacting the cover 16. The collar 18 also includes fastener mounts 19 for spring clips 20 to provide a detachable locking of the cover 16. The upper curved ends of the spring clips 20 engage with recesses 21 on the edges 22 of the cover 16 in the known way.

The edge 22 of the cover 16 have an open, double-wall or bottom groove design for receiving the insertion of a rubber seal 23. In use, the rubber seal 23 is tightly pressed against the top edge 22 of the electronics housing 8 by means of the spring clips 20 when the cover 16 is closed. The upper region of the ridge or collar is preferably provided with a peripheral reinforcement rib 24, formed along an inward facing wall surface. Slotlike openings 25 are formed at the top of the ridge or collar 18, in which rubber sleeves 26 are placed for watertight insertion of electrical connection cables from the engine space or the water chamber.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. In a bodywork for a passenger car which includes a forward door post, a fender stay connected thereto and extending in a forward longitudinal direction therefrom, a suspension strut mount disposed forwardly of and more towards a longitudinal center axis of said bodywork than said forward door post, and a front wheel arch, wherein the improvement comprises in operative combination:

a) a suspension strut bearer member disposed connected between said suspension strut mount and said forward door post;

b) said suspension strut bearer member in combination with said fender stay and said front wheel arch defining a pocket-like space having a generally polygonal top opening;
c) an electronics housing including a housing wall sized to fit within said pocket-like space;
d) a detachable top cover for said housing; and
e) said housing includes connection means disposed along an outwardly facing surface of said housing wall for connecting said electronics housing to said suspension strut bearer member, to said fender stay, and to adjacent portions of said front wheel arch.

2. The passenger car bodywork having the electronics housing as in claim 1 wherein at least a portion of said housing wall forms a wall region of said front wheel arch.

3. The passenger car bodywork having the electronics housing as in claim 2 wherein:
a) said connection means comprise flanges suitable for weld or glue adhesive connections.

4. The passenger car bodywork having the electronics housing as in claim 3 wherein said housing includes a hole in a bottom wall thereof disposed open to an interior passenger space of said passenger car.

5. The passenger car bodywork having the electronics housing as in claim 4 wherein said housing is formed as a cast aluminum piece.

6. The passenger car bodywork having the electronics housing as in claim 5 wherein said top cover is formed as a cast aluminum piece.

7. The passenger car bodywork having the electronics housing as in claim 1 wherein:
a) said connection means comprise flanges suitable for weld or glue adhesive connections.

8. The passenger car bodywork having the electronics housing as in claim 1 wherein said housing is formed as a cast aluminum piece.

9. The passenger car bodywork having the electronics housing as in claim 8 wherein said top cover is formed as a cast aluminum piece.

10. The passenger car bodywork having the electronics housing as in claim 9 wherein said housing includes a hole in a bottom wall thereof disposed open to an interior passenger space of said passenger car.

11. The passenger car bodywork having the electronics housing as in claim 1 wherein:
a) said housing includes an upraised peripheral collar at an upper top opening thereof which extends a distance above adjacent connecting portions of the passenger car bodywork.

12. The passenger car bodywork having the electronics housing as in claim 11 wherein said upraised peripheral collar includes at least one hole provided with a rubber sleeve for receiving a cable connector therethrough.

13. The passenger car bodywork having the electronics housing as in claim 12 wherein said upraised peripheral collar includes a reinforcing rib member disposed along an inner surface thereof.

14. The passenger car bodywork having the electronics housing as in claim 13 wherein said upraised peripheral collar includes means for removably attaching said top cover.

15. The passenger car bodywork having the electronics housing as in claim 14 wherein said top cover is formed as a cast aluminum piece.

16. The passenger car bodywork having the electronics housing as in claim 15 wherein said housing includes a hole in a bottom wall thereof disposed open to an interior passenger space of said passenger car.

17. The passenger car bodywork having the electronics housing as in claim 11 wherein said upraised peripheral collar includes a reinforcing rib member disposed along an inner surface thereof.

18. The passenger car bodywork having the electronics housing as in claim 11 wherein said upraised peripheral collar includes means for removably attaching said top cover.

19. The passenger car bodywork having the electronics housing as in claim 1 wherein said housing includes a hole in a bottom wall thereof disposed open to an interior passenger space of said passenger car.

* * * * *